(12) United States Patent
Kano (10) Patent No.: US 12,519,340 B2
(45) Date of Patent: Jan. 6, 2026

(54) UNINTERRUPTIBLE POWER SUPPLY

(71) Applicant: TMEIC Corporation, Tokyo (JP)

(72) Inventor: Masamichi Kano, Chuo-ku (JP)

(73) Assignee: TMEIC Corporation, Tokyo (JP)

( * ) Notice: Subject to any disclaimer, the term of this patent is extended or adjusted under 35 U.S.C. 154(b) by 0 days.

(21) Appl. No.: 18/862,224

(22) PCT Filed: Apr. 4, 2023

(86) PCT No.: PCT/JP2023/013913
§ 371 (c)(1),
(2) Date: Nov. 1, 2024

(87) PCT Pub. No.: WO2024/209530
PCT Pub. Date: Oct. 10, 2024

(65) Prior Publication Data
US 2025/0350145 A1    Nov. 13, 2025

(51) Int. Cl.
*H02J 13/00* (2006.01)
*H02J 7/00* (2006.01)
*H02J 9/06* (2006.01)

(52) U.S. Cl.
CPC .... *H02J 13/00016* (2020.01); *H02J 7/00032* (2020.01); *H02J 7/0068* (2013.01); *H02J 9/062* (2013.01); *H02J 2207/20* (2020.01)

(58) Field of Classification Search
CPC ............. H02J 13/00016; H02J 7/00032; H02J 7/0068; H02J 9/062; H02J 2207/20
See application file for complete search history.

(56) References Cited

U.S. PATENT DOCUMENTS 10,630,104 B2 *   4/2020   Gonzalez ................ H02M 7/44

FOREIGN PATENT DOCUMENTS

JP          2018-182872 A      11/2018

OTHER PUBLICATIONS

International Search Report issued on Jun. 20, 2023, in PCT/JP2023/013913 filed on Apr. 4, 2023, 2 pages.

* cited by examiner

*Primary Examiner* — Carlos Amaya
(74) *Attorney, Agent, or Firm* — Oblon, McClelland, Maier & Neustadt, L.L.P.

(57) ABSTRACT

When the processor receives execution data, the processor causes an executable program to progress based on the execution data. When the processor receives update data, the processor writes the update data into a memory and causes updating of an update program to progress. When the update of the update program is completed and the programmable device is thereafter reset, the processor ends the executable program and launches the update program as the executable program.

13 Claims, 7 Drawing Sheets

UNINTERRUPTIBLE POWER SUPPLY

TECHNICAL FIELD

The present disclosure relates to an uninterruptible power supply.

BACKGROUND ART

Japanese Patent Laying-Open No. 2018-182872 (PTL 1) discloses a power supply system which includes: multiple power supplies each having a slave control device; and a master control device which provides commands to the respective slave control circuits of the power supplies. In the power supply system, each slave control device is configured of a programmable device and includes a high-speed serial communication unit connected to the master control device. Each slave control device receives, for example, a command value from the master control device via the high-speed serial communication unit and transmits the operational status of the power supply to the master control device via the high-speed serial communication unit.

CITATION LIST

Patent Literature

PTL 1: Japanese Patent Laying-Open No. 2018-182872

SUMMARY OF INVENTION

Technical Problem

In the above power supply system, the serial communications are employed for the exchange of data between the master control device and the slave control devices, thereby reducing the number of lines that are connected between the master control device and the slave control devices.

However, the update of software (a program) installed in the programmable device of each slave control device requires connecting a computer to each slave control device via a programming cable, and downloading update data from the computer to the programmable device.

For this reason, in the power supply having a large-scale and complex structure, the arrangement of a control board having the programmable device mounted thereon needs to be designed, taking into an account the ease of performance of the update process. Moreover, there is a concern that an increase in number of power supplies mounted on the uninterruptible power supply may cause a tremendous amount of time and labor for the update process. Plus, since the update process needs to be performed while the normal communications for allowing the operations of the power supplies are disconnected, the power supplies needs be continuously stopped during the update process.

In addition, if the programmable device requires a reset operation upon update, each programmable device needs to be manually and individually reset or a transmission line needs to be separately installed for the transmission of a reset signal to each programmable device.

Therefore, a primary object of the present disclosure is to provide an uninterruptible power supply capable of efficient program update in a simplified configuration.

Solution to Problem

An uninterruptible power supply according to one aspect of the present disclosure includes a plurality of modules, a main controller, a plurality of controllers, and a serial communications line. The main controller controls the plurality of modules. The plurality of controllers each include a programmable device, and respectively drive the plurality of modules through communications with the main controller. The serial communications line communicatively connects the main controller and the plurality of controllers. The programmable device includes a memory and a processor. The memory stores an executable program and an update program. The processor executes the executable program to drive a corresponding module. While the executable program is being executed, the main controller is able to transmit one of the execution data and the update data to the programmable device via the serial communications line. The execution data is data that is used for executing the executable program. The update data is data that is used for updating the update program. When the processor receives the execution data, the processor causes the executable program to progress based on the execution data. When the processor receives the update data, the processor writes the update data to the memory and causes updating of the update program to progress. When the programmable device is reset after the updating of the update program is completed, the processor ends the executable program and launches the update program as the executable program.

Advantageous Effects of Invention

According to the present disclosure, an uninterruptible power supply can be provided which is capable of efficient program update in a simplified configuration.

DESCRIPTION OF EMBODIMENTS

Hereinafter, embodiments of the present disclosure will be described in detail, with reference to the accompanying drawings. Note that in the following, the same reference sign is used to refer to like or corresponding components in the drawings, and description thereof will in principle not be repeated.

Embodiment 1

Figure 1:
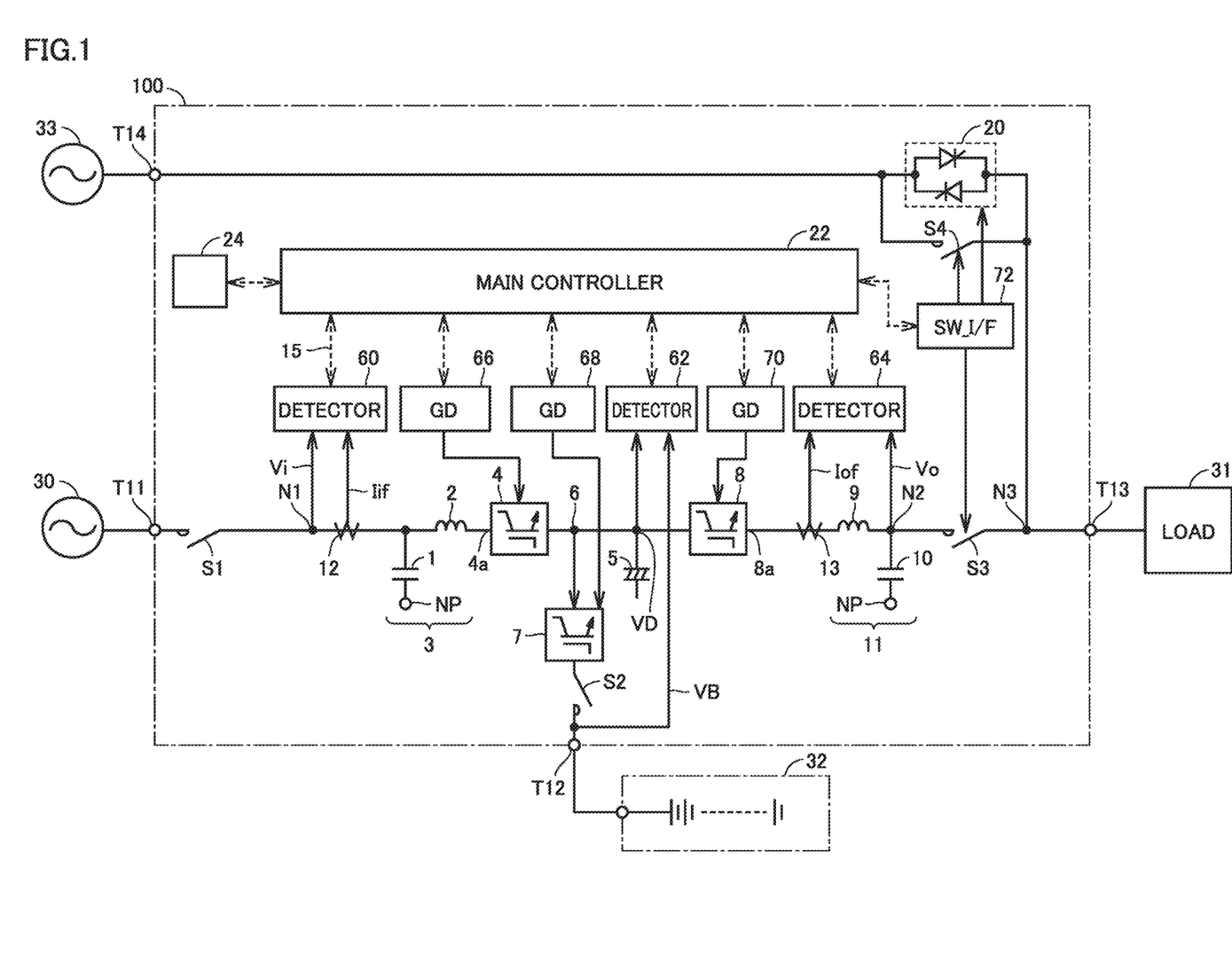
FIG. 1 is a circuit block diagram showing a configuration of an uninterruptible power supply according to Embodiment 1.

FIG. 1 is a circuit block diagram showing a configuration of an uninterruptible power supply 100 according to Embodiment 1. The uninterruptible power supply 100 according to Embodiment 1 once converts a three-phase alternating-current (AC) power, supplied from a commercial AC power supply 30 into a direct-current (DC) power, converts the DC power into a three-phase AC power, and supplies the three-phase AC power to a load 31. In FIG. 1, for ease of illustration and explanation, only circuits that correspond to one phase (e.g., U phase), among three phases (U phase, V phase, and W phase), are shown.

Referring to FIG. 1, the uninterruptible power supply 100 includes an AC input terminal T11, a battery terminal T12, an AC output terminal T13, and a bypass input terminal T14. The AC input terminal T11 receives an AC power having a commercial frequency from the commercial AC power supply 30. The bypass input terminal T14 receives an AC power having a commercial frequency from a bypass AC power supply 33. The bypass AC power supply 33 may be a commercial AC power supply or a generator.

The battery terminal T12 is connected to a battery 32. The battery 32 stores DC power. The battery 32 corresponds to one example of a "power storage device." The battery terminal T12 may be connected to a capacitor, instead of the battery 32. The AC output terminal T13 is connected to the load 31. The load 31 is driven with AC power.

The uninterruptible power supply 100 further includes electromagnetic contactors S1, S2, S3, S4, current detectors 12, 13, capacitors 1, 5, 10, reactors 2, 9, a converter 4, a bi-directional chopper 7, an inverter 8, a semiconductor switch 20, detectors 60, 62, 64, gate drivers 66, 68, 70, a switch interface (I/F) 72, an operating unit 24, and a main controller 22.

The electromagnetic contactors S1, S2, S3, S4 the current detectors 12, 13, the capacitors 1, 5, 10, the reactors 2, 9, the converter 4, the bi-directional chopper 7, the inverter 8, and the semiconductor switch 20 each correspond to one example of a "module." The detectors 60, 62, 64, the gate drivers 66, 68, 70, and the switch I/F 72 each correspond to one example of a "controller."

The electromagnetic contactor S1 has a first terminal connected to the AC input terminal T11, and a second terminal (a node N1) connected to a first terminal of the reactor 2. The reactor 2 has a second terminal connected to an AC terminal 4a of the converter 4. The capacitor 1 is connected between the node N1 and a neutral NP. The neutral NP receives a ground voltage, for example. The electromagnetic contactor S1 is on when the uninterruptible power supply 100 is in use, and off during maintenance of the uninterruptible power supply 100, for example.

The instantaneous value of an AC input voltage Vi appearing at the node N1 is detected by the detector 60. The current detector 12 detects an AC input current Ii flowing through the node N1, and outputs a signal Iif indicating a detection value of the AC input current Ii to the detector 60. The detector 60 is connected to the main controller 22 via a communications line 15. The communications line 15 is configured to bidirectionally transmit data through serial communications. The communications line 15 corresponds to one example of a "serial communications line." The detector 60 provides a signal indicating a detection value of the instantaneous value of the AC input voltage Vi and the signal Iif indicating the detection value of the AC input current Ii to the main controller 22 via the communications line 15.

The capacitor 1 and the reactor 2 form an AC filter 3, which allows the AC power having the commercial frequency to pass therethrough and prevents a current having a switching frequency generated at the converter 4 from passing therethrough to the commercial AC power supply 30.

The converter 4 is controlled by the main controller 22. In normal operation where the converter 4 is supplied with AC power from the commercial AC power supply 30, the converter 4 converts the AC power into DC power, and outputs the DC power to a DC line 6. When the AC power is not successfully supplied from the commercial AC power supply 30 (in the event of failure of the commercial AC power supply 30), the operation of the converter 4 is stopped. The output voltage of the converter 4 can be controlled to a desired value.

Specifically, the converter 4 has multiple switching elements not shown. The switching elements are connected to a gate driver (GD) 66. The gate driver 66 is connected to the main controller 22 via the communications line 15, and drives the switching elements in accordance with gate signals provided from the main controller 22.

The capacitor 5 is connected to the DC line 6, and smooths the voltage at the DC line 6. The instantaneous value of a DC voltage VD appearing at the DC line 6 is detected by the detector 62. The DC line 6 is connected to a high-voltage side node of the bi-directional chopper 7, and a low-voltage side node of the bi-directional chopper 7 is connected to the battery terminal T12 via the electromagnetic contactor S2.

The electromagnetic contactor S2 is on when the uninterruptible power supply 100 is in use, and off during maintenance of the uninterruptible power supply 100 and the battery 32, for example. The instantaneous value of a voltage VB across the battery 32 appearing at the battery terminal T12 is detected by the detector 62. The detector 62 is connected to the main controller 22 via the communications line 15. The detector 62 provides a signal indicating the detection value of the instantaneous value of the DC voltage VD and a signal indicating the detection value of the instantaneous value of the voltage VB across the battery 32 to the main controller 22 via the communications line 15.

The bi-directional chopper 7 is controlled by the main controller 22. In normal operation, the bi-directional chopper 7 stores the DC power generated by the converter 4 into the battery 32. In the event of failure of the commercial AC power supply 30, the bi-directional chopper 7 supplies the DC power stored in the battery 32 to the inverter 8 via the DC line 6.

When storing the DC power into the battery 32, the bi-directional chopper 7 steps down and provides the DC voltage VD at the DC line 6 to the battery 32. When supplying the DC power stored in the battery 32 to the inverter 8, the bi-directional chopper 7 steps up and outputs the voltage VB across the battery 32 to the DC line 6. The DC line 6 is connected to an input node of the inverter 8.

Specifically, the bi-directional chopper 7 has multiple switching elements not shown. The switching elements are connected to a gate driver (GD) 68. The gate driver 68 is connected to the main controller 22 via the communications line 15, and drives the switching elements in accordance with gate signals provided from the main controller 22.

The inverter 8 is controlled by the main controller 22, and converts the DC power, supplied from the converter 4 or the bi-directional chopper 7 via the DC line 6, into an AC power having a commercial frequency and outputs the AC power. In other words, the inverter 8, in normal operation, converts the DC power, supplied from the converter 4 via the DC line 6, into an AC power. In the event of failure of the commercial AC power supply 30, the inverter 8 converts the DC power, supplied from the battery 32 via the bi-directional chopper 7, into an AC power. The output voltage of the inverter 8 can be controlled to a desired value.

Specifically, the inverter 8 has multiple switching elements not shown. The switching elements are connected to the gate driver (GD) 70. The gate driver 70 is connected to the main controller 22 via the communications line 15, and drives the switching elements in accordance with gate signals provided from the main controller 22.

The inverter 8 has an AC terminal 8a connected to a first terminal of the reactor 9, the reactor 9 has a second terminal (a node N2) connected to a first terminal of the electromagnetic contactor S3, and the electromagnetic contactor S3 has a second terminal (a node N3) connected to the AC output terminal T13. The capacitor 10 is connected between the node N2 and the neutral NP. The neutral NP receives a ground voltage, for example.

The current detector 13 detects the instantaneous value of an output current Io of the inverter 8, and provides a signal Iof indicating a detection value of the instantaneous value to the detector 64. The instantaneous value of an AC output voltage Vo appearing at the node N2 is detected by the detector 64.

The detector 64 is connected to the main controller 22 via the communications line 15. The detector 64 provides a signal indicating a detection value of the instantaneous value of the AC output voltage Vo and the signal Iof indicating the detection value of the output current Io to the main controller 22 via the communications line 15.

The reactor 9 and the capacitor 10 form an AC filter 11, which allows the AC power having the commercial frequency generated at the inverter 8 to pass therethrough to the AC output terminal T13 and prevents the current having the switching frequency generated at the inverter 8 from passing therethrough to the AC output terminal T13.

The electromagnetic contactor S3 is controlled by the main controller 22. The electromagnetic contactor S3 is on in an inverter power feed mode in which the AC power generated by the inverter 8 is supplied to the load 31, and off in a bypass power feed mode in which the AC power from the bypass AC power supply 33 is supplied to the load 31.

The semiconductor switch 20 includes a pair of thyristors connected in anti-parallel to each other, and is connected between the bypass input terminal T14 and the node N3. The electromagnetic contactor S4 is connected in parallel to the semiconductor switch 20. The semiconductor switch 20 is controlled by the main controller 22. In normal operation, the semiconductor switch 20 is off. The semiconductor switch 20 is instantly turned on upon a failure of the inverter 8 and supplies the AC power from the bypass AC power supply 33 to the load 31. The semiconductor switch 20 turns off after the elapse of a predetermined period of time since being turned on.

The electromagnetic contactor S4 is off in the inverter power feed mode in which the AC power generated by the inverter 8 is supplied to the load 31, and on in the bypass power feed mode in which the AC power from the bypass AC power supply 33 is supplied to the load 31.

The electromagnetic contactor S4 turns on in the event of failure of the inverter 8, and supplies the AC power from the bypass AC power supply 33 to the load 31. In other words, in the event of failure of the inverter 8, the semiconductor switch 20 instantly turns on just for a predetermined period of time, and the electromagnetic contactor S4 turns on. This is to prevent the semiconductor switch 20 from being overheated and damaged.

Specifically, the electromagnetic contactors S3 and S4 and the semiconductor switch 20 are connected to the switch I/F 72. The switch I/F 72 is connected to the main controller 22 via the communications line 15. The switch I/F 72 turns the electromagnetic contactors S3 and S4 and the semiconductor switch 20 on or off in accordance with an ON command or an OFF command from the main controller 22.

The operating unit 24 includes multiple buttons, which are operated by a user of the uninterruptible power supply 100, a display for showing various information, etc. The user can operate the operating unit 24 to power on or off the uninterruptible power supply 100 or select one of the bypass power feed mode and the inverter power feed mode.

Figure 2:
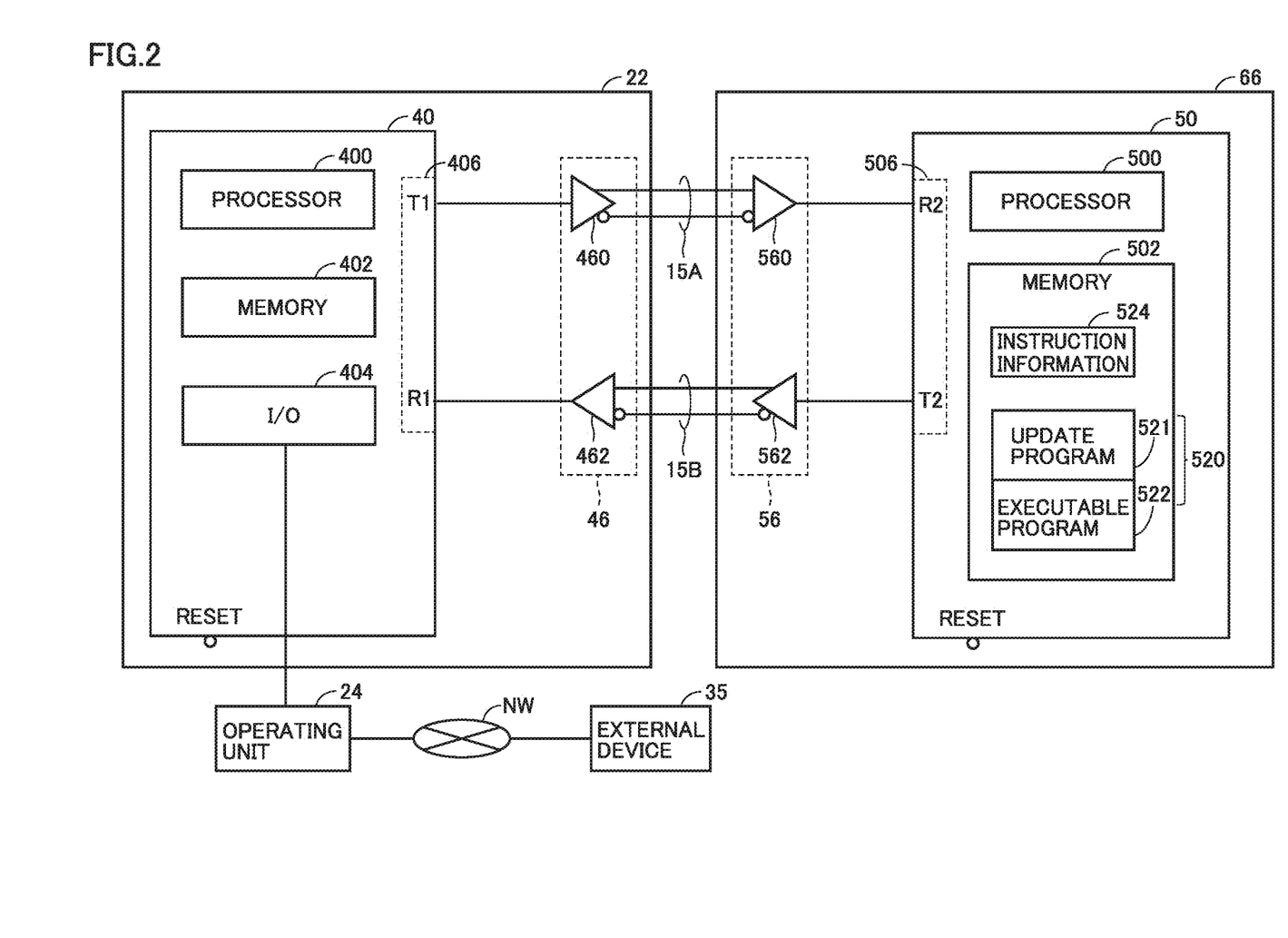
FIG. 2 is a block diagram showing a configuration of a main controller and a gate driver.

The operating unit 24 is connected to a communication network NW and can exchange data with an external device 35 external to the uninterruptible power supply 100 via the communication network NW (see FIG. 2). Examples of the external device 35 include a personal computer (PC) or a server. The operating unit 24 may further have a USB connector. In this case, the operating unit 24 exchanges data with the external device 35 via the USB connector.

The user can directly operate the operating unit 24 or use the external device 35 to remotely operate the operating unit 24 to execute an update start command for the programs installed in the main controller 22, and the detectors 60, 62, 64, the gate drivers 66, 68, 70 and the switch I/F 72 and execute a reset command for each device after completion of the update. The program update process will be described below in detail.

The main controller 22 controls the entirety of the uninterruptible power supply 100, based on the signal from the operating unit 24 and the signals from the detectors 60, 62, 64, etc. In other words, the main controller 22 detects whether a power outage has occurred, based on the detection value of the AC input voltage Vi, and controls the converter 4 and the inverter 8 in synch with the phase of the AC input voltage Vi.

The main controller 22 also controls the converter 4, based on the AC input voltage Vi, the AC input current Ii, and the DC voltage VD. The main controller 22, in normal operation, controls the converter 4 so that the DC voltage VD is a desired target voltage VDT. In the event of failure of the commercial AC power supply 30, the main controller 22 stops the operation of the converter 4.

The main controller 22 also controls the bi-directional chopper 7, based on the DC voltage VD and the battery voltage VB. The main controller 22, in normal operation, controls the bi-directional chopper 7 so that the battery voltage VB is a desired target battery voltage VBT. In the event of failure of the commercial AC power supply 30, the main controller 22 controls the bi-directional chopper 7 so that the DC voltage VD is the desired target voltage VDT.

The main controller 22 also controls the inverter 8 so that the AC output voltage Vo is a desired target voltage VoT, based on the AC output current Io and the AC output voltage Vo.

The controls of the converter 4, the bi-directional chopper 7, and the inverter 8 described above are implemented by each of the main controller 22, and the detectors 60, 62, 64, the gate drivers 66, 68, 70, and the switch I/F 72 executing a pre-installed program and exchanging data with each other via the communications line 15.

In other words, the detectors 60, 62, 64, the gate drivers 66, 68, 70, and the switch I/F 72 each correspond to one example of a "controller" for controlling the operation of a respective module of the uninterruptible power supply 100 under the control by the main controller 22 controlling the entirety of the uninterruptible power supply 100. In the present embodiment, data can be exchanged between the main controller and a respective controller through the serial communications. This can reduce the growth in number of lines connected to the main controller 22 in case of more modules.

Next, a configuration of each of the main controller 22, and the detectors 60, 62, 64, the gate drivers 66, 68, 70 and the switch I/F 72 is described. The detectors 60, 62, 64, the gate drivers 66, 68, 70 and the switch I/F 72 have the same basic configuration. Thus, a configuration of the gate driver 66 will be representatively illustrated in the following description.

FIG. 2 is a block diagram showing a configuration of the main controller 22 and the gate driver 66. Referring to FIG. 2, the main controller 22 and the gate driver 66 are connected to each other by the communications line 15 so that they can bidirectionally communicate with each other. The communications line 15 is configured to bidirectionally transfer data through serial communications. The communications line 15 includes a communications line 15A for transfer of data from the main controller 22 to the gate driver 66, and a communications line 15B for transfer of data from the gate driver 66 to the main controller 22.

The main controller 22 and the gate driver 66 execute a program pre-stored in a memory to cooperate with each other to control the converter 4.

The main controller 22 includes a programmable device 40 and a serial communications I/F 46.

The programmable device 40 includes a processor 400, a memory 402, an input/output (I/O) circuit 404, and a communications I/F 406. The processor 400, the memory 402, the I/O circuit 404 and the communications I/F 406 can transmit/receive signals to/from each other via a bus not shown. The programmable device 40 may be implemented as a control board which includes the processor 400.

The processor 400 is configured of at least one integrated circuit. The integrated circuit can be configured of, for example, at least one central processing unit (CPU), at least one micro processing unit (MPU), at least one field programmable gate array (FPGA), or a combination thereof.

The memory 402 includes a read only memory (ROM) and a random access memory (RAM). The processor 400 executes various programs to control the operation of the uninterruptible power supply 100. The processor 400 reads a program from the RAM into the ROM. The RAM functions as a working memory, and temporarily stores various data that are used to execute the program. The I/O circuit 404 is connected to the operating unit 24 and can transmit/receive signals to/from the operating unit 24.

The communications I/F 406 is an interface for exchange of data with the gate driver 66.

The programmable device 40 generates a transmission signal (transmission data) T1, and outputs the transmission signal T1 to a driver 460 within the serial communications I/F 46. The programmable device 40 has a parallel-to-serial converter for converting the transmission signal T1, which is parallel data, into serial data.

The programmable device 40 transmits to a programmable device 50 data for the programmable device 50 to drive the converter 4 (execution data described below), or data for the programmable device 50 to update the programmable device 50 (update data described below). These data are transmitted from the operating unit 24 to the programmable device 40. Note that a dedicated programmable device for transmitting the update data may be provided separately from the programmable device 40.

The serial communications I/F 46 is a communications interface for exchange of various data between the main controller 22 and the gate driver 66 through the serial communications using the communications line 15. The serial communications I/F 46 has the driver 460 and a receiver 462.

The driver 460 is provided with the transmission signal T1 output from the programmable device 40. The driver 460 transmits data responsive to the transmission signal to the gate driver 66 via the communications line 15A.

The receiver 462 receives the data, which is transmitted from the gate driver 66 via the communications line 15B, and outputs the data to the programmable device 40 as a receive signal. The receiver 462 outputs the data from the gate driver 66 to the programmable device 40 as a receive signal R1.

The programmable device 40 receives the receive signal R1 output from the receiver 462 and performs a predetermined process based on the receive signal R1. The programmable device 40 has a serial-to-parallel converter for converting the receive signal R1, which is serial data, into parallel data.

The gate driver 66 includes the programmable device 50 and a serial communications I/F 56. The programmable device 50 includes a processor 500 and a memory 502. The memory 502 includes an executable-program storage area 522, an update-program storage area 521, and an instruction-information storage area 524. The update-program storage area 521 corresponds to one example of a "second storage area." The executable-program storage area 522 corresponds to one example of a "first storage area."

The executable-program storage area 522 stores an executable program (described below). The update-program storage area 521 stores an update program (described below). The instruction-information storage area 524 stores instruction information (described below).

The processor 500 and the memory 502 can transmit/receive signals to/from each other via a bus not shown. The programmable device 50 may be implemented as a control board that includes the processor 500 and the memory 502.

The processor 500 is configured of at least one integrated circuit. The integrated circuit can be configured of, for example, at least one CPU, at least one MPU, at least one FPGA, or a combination thereof.

The processor 500 executes various programs to drive the switching elements included in the converter 4. The processor 500 deploys programs (the executable program, etc.) stored in the ROM for execution on the RAM. Various processes that are performed by the processor 500 are written in the programs stored in the ROM. The RAM functions as a working memory, and temporarily stores various data that are required to execute the programs.

The programmable device 50 has a parallel-to-serial converter for converting a transmission signal T2, which is parallel data, into serial data.

The transmission signal T2 from the processor 500 is output to a driver 562 within the serial communications I/F 56. The serial communications I/F 56 is a communications interface for exchange of various data between the gate driver 66 and the main controller 22 through the serial communications using the communications line 15. The serial communications I/F 56 has a receiver 560 and the driver 562.

The receiver 560 receives the data transmitted from the main controller 22 via the communications line 15A, and outputs the data to the processor 500 as a receive data. The receiver 560 outputs the data from the main controller 22 to the processor 500 as a receive signal (receive data) R2.

The processor 500 receives a receive signal R2 output from the receiver 560, and performs a predetermined process based on the input receive signal R2. The processor 500 has a serial-to-parallel converter for converting the receive signal R2, which is serial data, into parallel data.

The driver 562 is provided with the transmission signal (the transmission data) T2 output from the programmable device 50. The driver 562 transmits data responsive to the transmission signal T2 to the main controller 22 via the communications line 15B.

As described above, the memory 502 stores the executable program in the executable-program storage area 522, and the update program in the update-program storage area 521. The processor 500 executes the executable program to drive the converter 4.

During the execution of the executable program, the programmable device 40 included in the main controller 22 can transmit one of the execution data and the update data as the receive signal R2 to the programmable device 50 via the communications line 15. The execution data is data that is used for the execution of the executable program. When received the execution data, the processor 500 causes the executable program to progress based on the execution data, to drive the converter 4. The execution data includes instructions, values, etc. for causing the executable program to operate.

The update data is data that is used to update the update program. When received the update data, the processor 500 writes the update data into the memory 502 and causes updating of the update program to progress. The transmission of the update data is initiated by a user operation (a start update command) on the operating unit 24.

For example, assume that the execution data is transmitted from the programmable device 40 to the programmable device 50 in a predetermined cycle (e.g., every ten milliseconds). The update data may be transmitted from the programmable device 40 to the programmable device 50 at a moment when the execution data is not being transmitted. For example, the first five milliseconds out of ten milliseconds may be used to transmit the execution data, and the last five milliseconds may be used to transmit the update data. In this way, updating of the program progresses, while the converter 4 is being driven.

The execution data and the update data are both transmitted, using the communications line 15. Accordingly, the programmable device 50 of the gate driver 66 can be updated by the main controller 22, without increasing the number of communications lines. As shown in FIG. 1, the main controller 22 is connected to multiple controllers (the detectors 60, 62, 64, the gate drivers 66, 68, 70, and the switch I/F 72) through the communications line 15.

Accordingly, forming a communication path for update between the main controller 22 and a respective controller by using the communications line 15, the main controller 22 can cause the update process of any controller to progress, while causing all the modules (the electromagnetic contactors S1, S2, S3, S4, the current detectors 12, 13, the capacitors 1, 5, 10, the reactors 2, 9, the converter 4, the bi-directional chopper 7, the inverter 8, and the semiconductor switch 20) to operate.

Upon completion of the update of the update program (completion of rewriting of the update program), the processor 500 stores instruction information (such as a flag) for instructing switching between programs, into the instruction-information storage area 524 of the memory 502.

When the programmable device 50 is reset after the completion of update of the update program, the processor 500 ends the executable program and launches the update program as an executable program. The user can confirm at the operating unit 24 whether the update is completed or not.

The programmable device 40 can transmit reset command data for resetting the programmable device 50 to the programmable device 50 via the communications line 15.

In the present embodiment, the programmable device 50 is reset by a reset switch installed on the programmable device 50 being operated. Alternatively, the programmable device 50 resets itself when it receives the reset command data. The reset command data is transmitted by a user operation on the operating unit 24.

Figure 3:
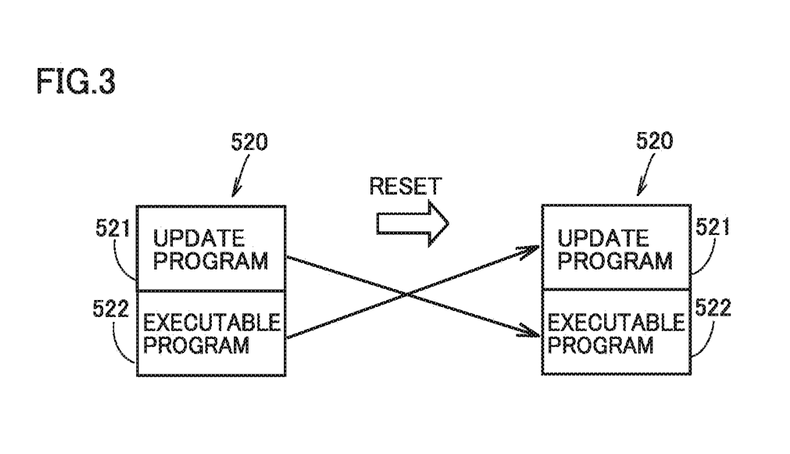
FIG. 3 is a diagram illustrating switching between executable programs upon reset.

FIG. 3 is a diagram illustrating switching between executable programs upon reset. When the programmable device 50 is reset and the instruction information is stored in the memory 502, the processor 500 ends the executable program and launches the update program as an executable program. Specifically, as shown in FIG. 3, the processor 500 stores the update program, stored in the update-program storage area 521, into the executable-program storage area 522 as an executable program, and stores the executable program, stored in the executable-program storage area 522, into the update-program storage area 521 as an update program.

Note that if the programmable device 50 is reset and the instruction information is stored in the memory 502, the processor 500 may use the program stored in the update-program storage area 521 as an executable program and use the program stored in the executable-program storage area 522 as a update program (to be updated), without switching between (rewriting) the programs as described above.

Figure 4:
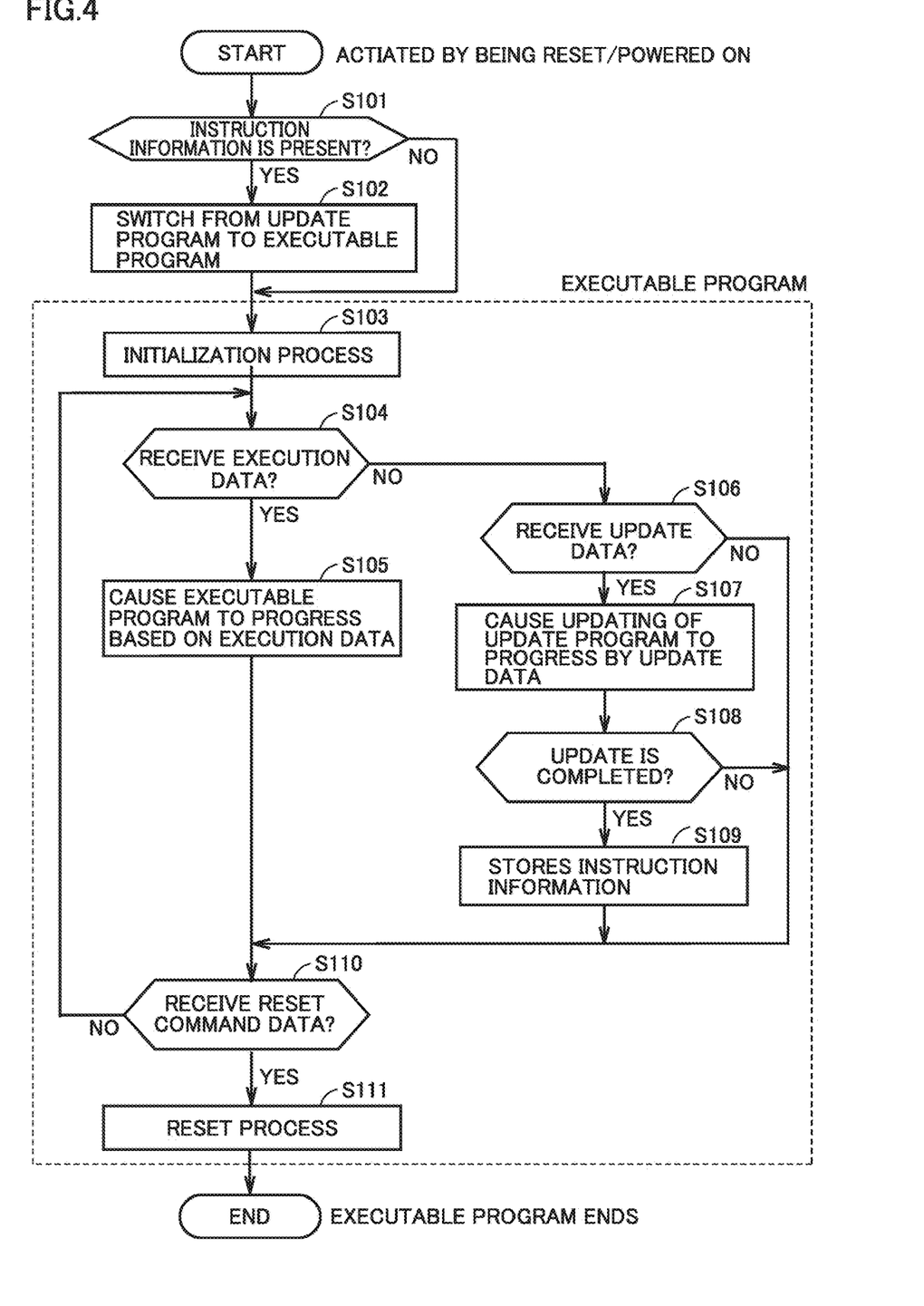
FIG. 4 is a flowchart illustrating the procedure of a process performed by a gate driver.

The description is provided below with a flowchart. FIG. 4 is a flowchart illustrating the procedure of a process performed by the gate driver 66. The process starts when the programmable device 50 of the gate driver 66 is activated with supply of power or when the programmable device 50 is reset and restarts.

The processor 500 of the programmable device 50, in step (hereinafter, step is simply denoted as "S") 101, determines whether the instruction information is stored in the instruction-information storage area 524 of the memory 502.

If the instruction information is stored in the instruction-information storage area 524 of the memory 502 (YES in S101), the processor 500 switches between the executable program stored in the executable-program storage area 522 and the update program stored in the update-program storage area 521 (S102) by the method described in FIG. 3.

If no instruction information is stored in the instruction-information storage area 524 of the memory 502 (NO in S101), in contrast, the processor 500 does not switch between the executable program and the update program.

Hereinafter, the executable program is executed in S103 through S111 until the programmable device 50 is reset or the supply of power to the programmable device 50 is interrupted. If the instruction information is stored (the update is completed and the programmable device 50 is reset), the updated program is executed. The processor 500, in S103, performs a process for initializing the programmable device 50.

If received the execution data (YES in S104), the processor 500 causes the executable program to progress based on the execution data (S105), and passes the process to S110. This causes the process for driving the converter 4 to progress.

If the processor 500 does not receive the execution data (NO in S104) and receives the update data (YES in S106), the processor 500 causes updating of the update program stored in the update-program storage area 521 to progress by writing the update data to the update program (S107). As described above, the transmission of the update data is initiated by a user operation on the operating unit 24 (the start update command).

If the update of the update program is completed (YES in S108), the processor 500 stores the instruction information into the instruction-information storage area 524 of the memory 502 (S109), and passes the process to S110.

If the processor 500 does not receive the reset command data (NO in S110), the processor 500 returns the process to S104. This causes the process steps S104 through S110 to be repeated until the processor 500 receives the reset command data. In S104 through S110, if the processor 500 receives the execution data, the processor 500 causes the executable program to progress, and if the processor 500 receives the update data, the processor 500 causes updating of the update program to progress.

After the completion of the update, the programmable device 50 receives a reset command, based on a user operation on the operating unit 24. For example, upon completion of the update, the programmable device 40 transmits an update complete flag to the programmable device 50. The user is allowed to confirm the completion of the update (the update complete flag) on the operating unit 24. The user, then, operates the operating unit 24 and thereby transmits the reset command data to the programmable device 40.

If the processor 500 receives the reset command (YES in S110), the processor 500 resets the programmable device 50 (S111), and the process ends (the executable program ends). Then, the reset of the programmable device 50 restarts the programmable device 50 and the process re-runs. If the programmable device 50 is reset by the completion of the update, the updated executable program launches.

As such, according to the uninterruptible power supply 100 of Embodiment 1, the multiple modules (the converter 4, etc.) include: the converter 4 which converts the AC power supplied from the commercial AC power supply 30 into DC power; the inverter 8 which converts the DC power supplied from the converter 4 or the battery 32 into AC power and supplies the AC power to a load; and the bi-directional chopper 7 which selectively performs the charging operation in which some of the DC power generated by the converter 4 is stored into the battery 32 and the discharging operation in which the DC power stored in the battery 32 is supplied to the inverter 8. The multiple controllers (the gate driver 66, etc.) include multiple gate drivers (the gate drivers 66, 68, 70) that drive the converter 4, the inverter 8, and the bi-directional chopper 7, respectively.

In the above configuration, the uninterruptible power supply 100 includes multiple modules (the converter 4, etc.), the main controller 22, multiple controllers (the gate driver 66, etc.), and the communications line 15. The main controller 22 controls the modules (the converter 4, etc.). The controllers (the gate driver 66, etc.) each include the programmable device 50 and drive the respective modules (the converter 4, etc.) through the communications with the main controller 22. The communications line 15 communicatively connect to the main controller 22 and the controllers (the gate driver 66, etc.). The programmable device 50 includes the memory 502 and the processor 500. The memory 502 stores the executable program and the update program. The processor 500 executes the executable program to drive a corresponding module. The main controller 22 can transmit one of the execution data and the update data to the programmable device 50 via the communications line 15 during the execution of the executable program. The execution data is data that is used to execute the executable program. The update data is data that is used to update the update program. If the processor 500 receives the execution data, the processor 500 causes the executable program to progress, based on the execution data. If the processor 500 receives the update data, the processor 500 writes the update data into the memory 502 and causes updating of the update program to progress. If the update of the update program is completed and the programmable device 50 is thereafter reset, the processor 500 ends the executable program and launches the update program as an executable program.

As such, using the shared communications line 15, the update program can be updated by the update program in parallel with the control of the converter 4 (a module) (the execution of the executable program) being continued by the execution data. The reset of the programmable device 50 after the completion of the update switches the executable program to the update program and launches the update program. Since there is no need to stop the operation of the uninterruptible power supply 100 (switch to the bypass power feed mode) during the update, the time period for stopping the operation of the uninterruptible power supply 100 can be reduced.

In particular, if the programs in all the programmable devices 50 are rewritten, and all the programmable devices 50 are thereafter reset simultaneously by a user operation via the communications line 15, the time period for stopping the operation of the uninterruptible power supply 100 can further be reduced. Even though the operation of the uninterruptible power supply 100 is, conventionally, stopped for a long period of time (e.g., tens of minutes) to update or reset the programs, the operation of the uninterruptible power supply 100 may now be stopped just for a short period of time (e.g., a few tens of seconds) to reset the programs. This enables all the controllers to be efficiently updated in a simplified configuration.

The main controller 22 can also transmit the reset command data for resetting the programmable device 50 to the programmable device 50 via the communications line 15. The programmable device 50 is reset when the programmable device 50 receives the reset command data.

Even with a configuration where the reset of the programmable device 50 is required to update the programmable device 50, the transmission of the reset command data via the communications line 15 enables the reset of the programmable device 50, thereby obviating the need for a manual reset operation or the need to separately provide a transmission line for transmitting a reset signal. This enables all the controllers to be efficiently updated in a simplified configuration.

Moreover, upon the completion of the update of the update program, the processor 500 stores the instruction information for instructing a switch of programs, into the memory 502. If the programmable device 50 is reset and the instruction information is stored in the memory 502, the processor 500 ends the executable program and launches the update program as an executable program. Owing to this, the reset after the completion of update can switch the executable program to the updated program.

The memory 502 includes the executable-program storage area 522 and the update-program storage area 521. The executable-program storage area 522 stores the executable program. The update-program storage area 521 stores the update program. When the programmable device 50 is reset, the processor 500 stores the executable program, stored in the executable-program storage area 522, into the update-program storage area 521 as an update program, and stores the update program, stored in the update-program storage area 521, into the executable-program storage area 522 as an executable program. Since the storage area dedicated to programs for causing the modules to operate and the storage area dedicated for programs for update are separately provided, all the controllers can be efficiently updated in a simplified configuration, while facilitating the software management.

Embodiment 2

Figure 5:
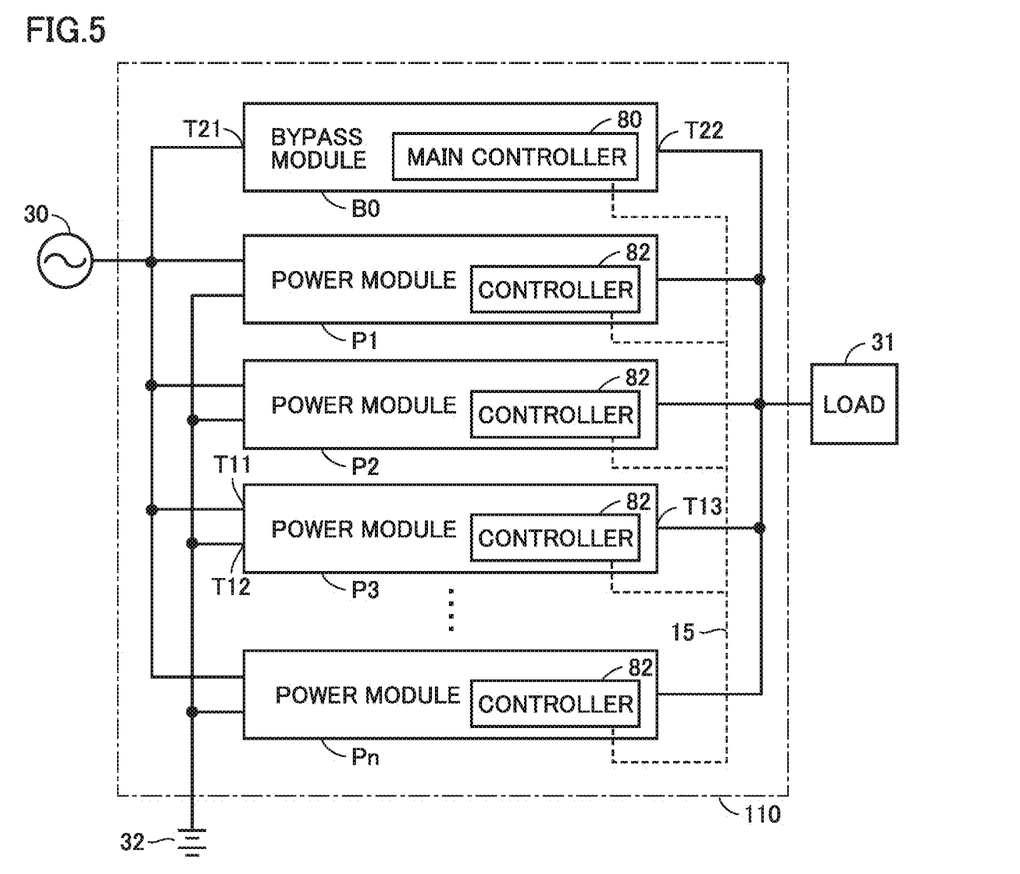
FIG. 5 is a circuit block diagram showing a configuration of an uninterruptible power supply according to Embodiment 2.

FIG. 5 is a circuit block diagram showing a configuration of an uninterruptible power supply 110 according to Embodiment 2. Referring to FIG. 5, the uninterruptible power supply 110 according to Embodiment 2 includes a bypass module B0, multiple power modules P1 through Pn (n is an integer greater than or equal to 2), a battery 32, and a communications line 15. The bypass module B0 and the power modules P1 through Pn are connected to each other through the communications line 15. The communications line 15 is configured to bidirectionally transmit data through serial communications.

The bypass module B0 has an AC input terminal T21, an AC output terminal T22, and a switch (not shown) connected between the AC input terminal T21 and the AC output terminal T22.

The power modules P1 through Pn are each a power converter module having a converter and an inverter. In the following description, the power modules P1 through Pn may be collectively referred to as a "power module P." The power module P has an AC input terminal T11, a battery terminal T12, and an AC output terminal T13.

The AC input terminal T21 of the bypass module B0 and the AC input terminal T11 of a respective power module P are connected to a commercial AC power supply 30. The AC input terminal T21 and a respective AC input terminal T11 receive an AC voltage Vi having a commercial frequency supplied from the commercial AC power supply 30.

The battery terminal T12 of a respective power module P is connected to the battery 32. The battery 32 stores DC power. The battery terminal T12 may be connected to a capacitor, instead of the battery 32.

The AC output terminal T22 of the bypass module B0 and the AC output terminal T13 of a respective power module P are connected to a load 31. In other words, the bypass module B0 and the power modules P1 through Pn are connected in parallel to each other between the commercial AC power supply 30 and the load 31. The load 31 is driven by the AC power supplied from the bypass module B0 or the power module P.

Such an uninterruptible power supply is referred to as a "modular uninterruptible power supply." The modular uninterruptible power supply has built therein a number of parallel circuits of the power modules according to the capacity of the uninterruptible power supply. In the present embodiment, for example, if the supply of power by the uninterruptible power supply requires (N−1) power modules, N power modules are implemented to ensure redundancy. This allows enhancement in power supply quality. The scheme to ensure the redundancy on a modular basis in a single uninterruptible power supply may be referred to as "hotswaping." Hotswapping means a structure which enables a power module to be stopped, removed, and inserted during the operation of an uninterruptible power supply. According to this, the power module P can be replaced while the supply of power by the uninterruptible power supply continues during a failure or inspection of the power module. Furthermore, resetting the power modules P one by one allows the completion of software update, without having to stop the supply of power by the uninterruptible power supply, as described below.

The uninterruptible power supply 110 has an inverter power feed mode and a bypass power feed mode. In the inverter power feed mode, the AC power is supplied from the power module P to the load 31. In the inverter power feed mode, the AC power supplied from the commercial AC power supply 30 is converted to DC power by the converter of the power module P, the DC power is converted into AC power by the inverter, and the AC power is supplied to the load 31. In the bypass power feed mode, the AC power is supplied from the commercial AC power supply 30 to the load 31 via the bypass module B0. In the bypass power feed mode, the AC power is supplied from the commercial AC power supply 30 to the load 31, without going through the power module P.

Figure 6:
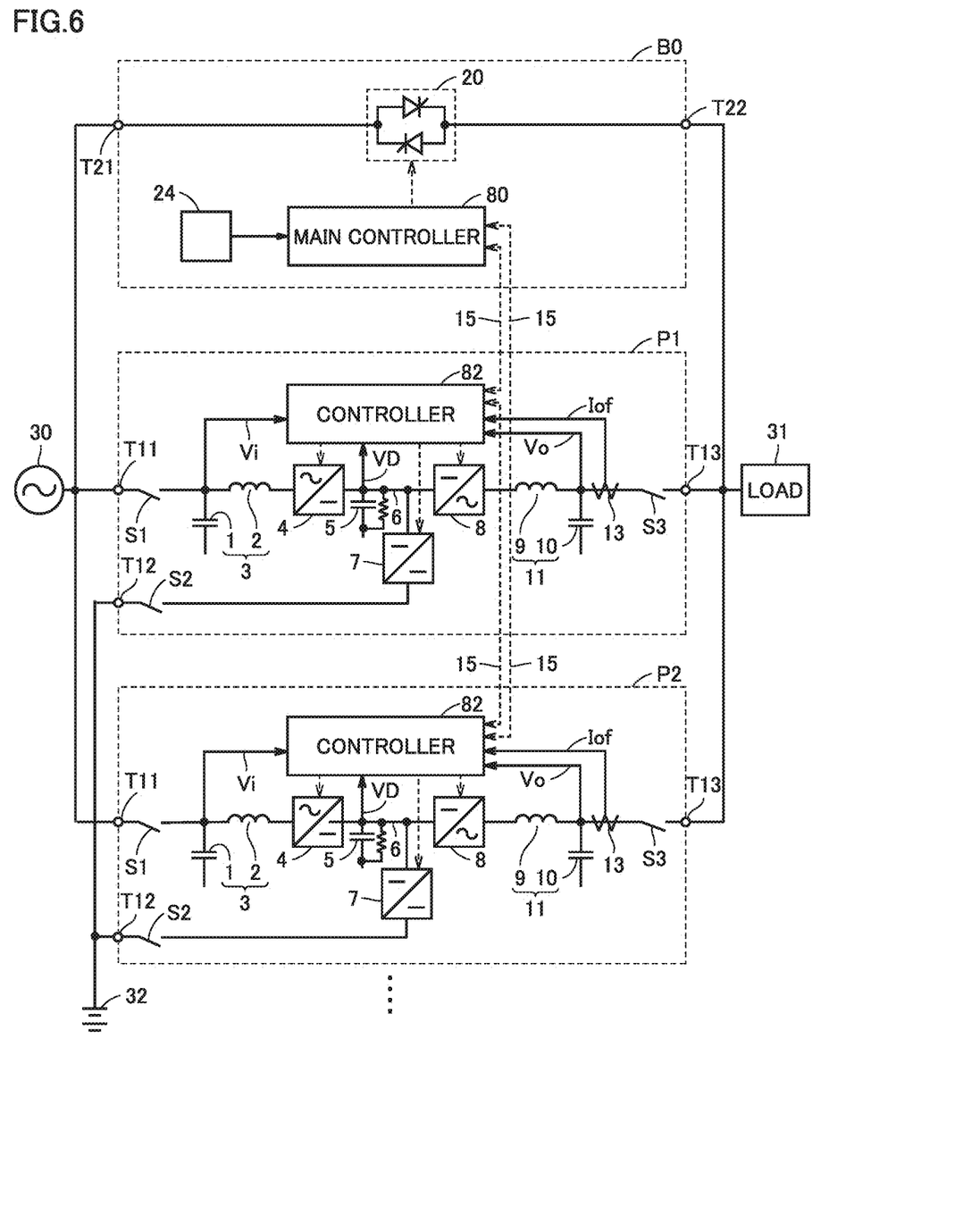
FIG. 6 is a circuit block diagram showing a configuration of a bypass module and a power module of FIG. 5.
Figure 7:
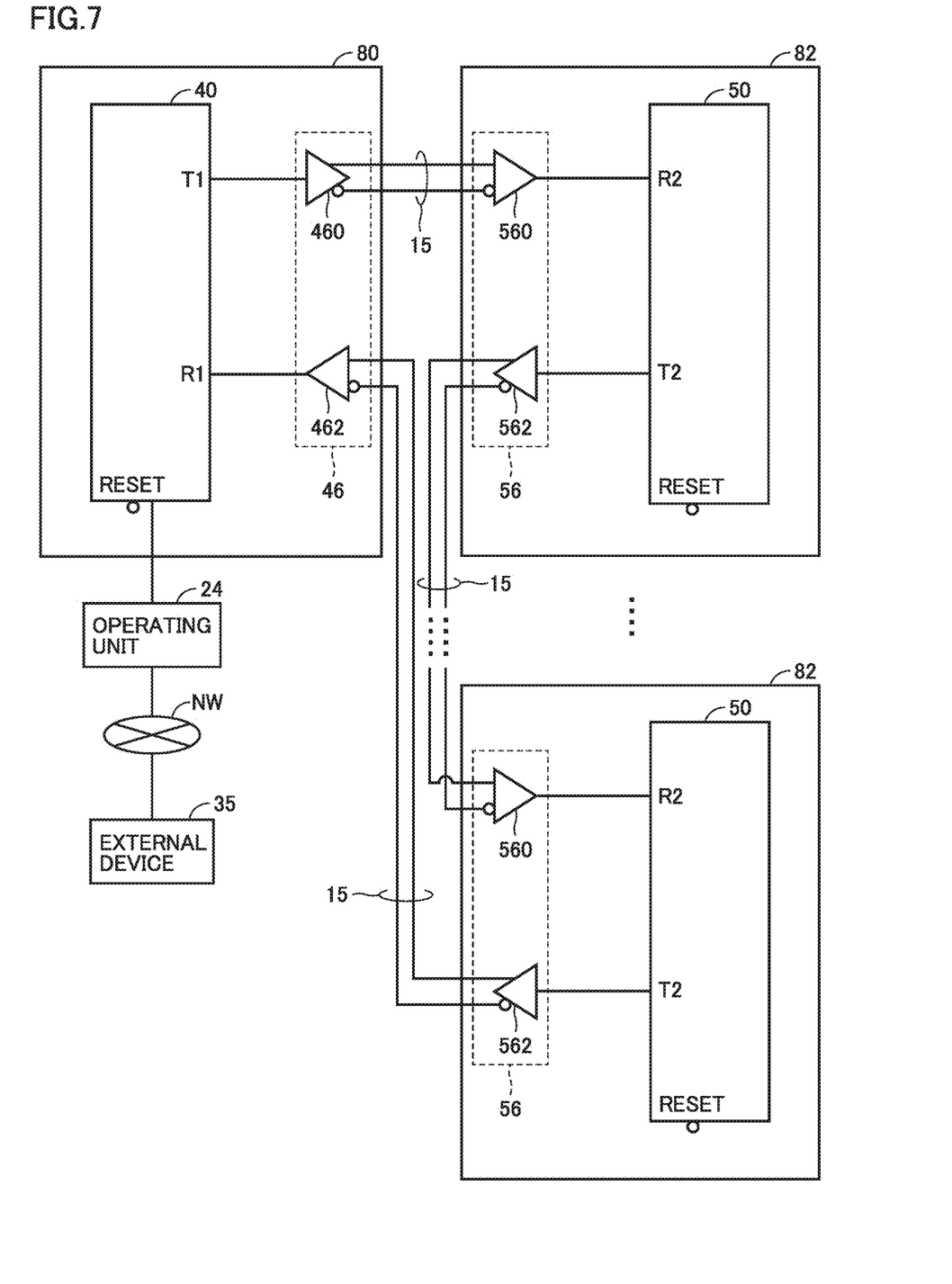
FIG. 7 is a block diagram showing a configuration of a main controller and controllers.

FIG. 6 is a circuit block diagram showing a configuration of the bypass module B0 and the power module P of FIG. 5. The uninterruptible power supply 110 converts a three-phase AC power from the commercial AC power supply 30 into DC power, converts the DC power into a three-phase AC power, and supplies the three-phase AC power to the load 31. In FIG. 7, for ease of illustration and explanation, only circuits that correspond to one phase, among three phases (U phase, V phase, and W phase), are shown.

As shown in FIG. 6, the bypass module B0 includes a semiconductor switch 20, a main controller 80, and an operating unit 24. The semiconductor switch 20 is connected between the AC input terminal T21 and the AC output terminal T22. The semiconductor switch 20 is, for example, a thyristor switch having a pair of thyristors connected in anti-parallel to each other. The semiconductor switch 20 is controlled by the main controller 80. The semiconductor switch 20 is off in the inverter power feed mode, and on in the bypass power feed mode.

The operating unit 24 includes multiple buttons, which are operated by a user of the uninterruptible power supply 110, and a display for showing various information, etc. The user can power on or off the uninterruptible power supply 110 or select one of the bypass power feed mode and the inverter power feed mode by operating the operating unit 24.

The operating unit 24 is connected to a communication network NW and can exchange data with an external device 35 external to the uninterruptible power supply 110 via the communication network NW (see FIG. 7). Examples of the external device 35 include a PC or a server. The operating unit 24 may further have a USB connector. In this case, the operating unit 24 exchanges data with the external device 35 via the USB connector.

Similarly to the uninterruptible power supply 100 (see FIG. 1) according to Embodiment 1, even in the uninterruptible power supply 110, the user can directly operate the operating unit 24 or remotely operate the operating unit 24 by using the external device 35 to execute an update start command for the programs installed in a respective controller 82 included in the power module P and execute a reset command for the controller 82 after completion of the update.

The power module P includes electromagnetic contactors S1 through S3, capacitors 1, 5, 10, reactors 2, 9, a converter 4, a DC line 6, a bi-directional chopper 7, an inverter 8, a current detector 13, and the controller 82.

The electromagnetic contactor S1 and the reactor 2 are connected in series between the AC input terminal T11 and an input node of the converter 4. The capacitor 1 is connected to a node N1 between the electromagnetic contactor S1 and the reactor 2. The electromagnetic contactor S1 turns on when a corresponding power module P is set in operation, and turns off when the power module P is stopped. The instantaneous value of an AC input voltage Vi appearing at the node N1 is detected by the controller 82. Based on the instantaneous value of the AC input voltage Vi, whether a power outage has occurred or not is determined.

The capacitor 1 and the reactor 2 form an AC filter 3. The AC filter 3 is a low-pass filter, and allows the AC power having the commercial frequency to pass therethrough from the commercial AC power supply 30 to the converter 4 and prevents a signal having a switching frequency generated at the converter 4 from passing therethrough to the commercial AC power supply 30.

The converter 4 is controlled by the controller 82. In normal operation where the AC power is supplied from the commercial AC power supply 30, the converter 4 converts the AC power into DC power, and outputs the DC power to the DC line 6. In the event of failure of the commercial AC power supply 30, the operation of the converter 4 is stopped.

The capacitor 5 is connected to the DC line 6, and smooths the voltage at the DC line 6. The instantaneous value of a DC voltage VD appearing at the DC line 6 is detected by the controller 82. The DC line 6 is connected to a high-voltage side node of the bi-directional chopper 7, and a low-voltage side node of the bi-directional chopper 7 is connected to the battery terminal T12 via the electromagnetic contactor S2.

The electromagnetic contactor S2 is on when a corresponding power module P is in use, and off during maintenance of the corresponding power module P and a corresponding battery 32. The instantaneous value of a voltage VB across the battery 32 appearing at the battery terminal T12 is detected by the controller 82.

The bi-directional chopper 7 is controlled by the controller 82. In normal operation, the bi-directional chopper 7 stores the DC power generated by the converter 4 into the battery 32. In the event of failure of the commercial AC power supply 30, the bi-directional chopper 7 supplies the DC power stored in the battery 32 to the inverter 8 via the DC line 6.

When storing the DC power into the battery 32, the bi-directional chopper 7 steps down and provides the DC voltage VD at the DC line 6 to the battery 32. When supplying the DC power stored in the battery 32 to the inverter 8, the bi-directional chopper 7 steps up and outputs the voltage VB across the battery 32 to the DC line 6. The DC line 6 is connected to an input node of the inverter 8.

The inverter 8 has an output node connected to a first terminal of the reactor 9, and a second terminal (a node N2) connected to the AC output terminal T13 via the electromagnetic contactor S3. The capacitor 10 is connected to the node N2. The instantaneous value of the AC output voltage Vo appearing at the node N2 is detected by the controller 82. The current detector 13 detects the instantaneous value of the current Io flowing through the AC output terminal T13 (i.e., the load 31) from the node N2 via the electromagnetic contactor S3, and provides the controller 82 with a signal Iof indicating a detection value of the instantaneous value.

The reactor 9 and the capacitor 10 form an AC filter 11. The AC filter 11 is a low-pass filter, and allows the AC power having the commercial frequency generated at the inverter 8 to pass therethrough to the AC output terminal T13 and prevents a signal having a switching frequency generated at the inverter 8 from passing therethrough to the AC output terminal T13. The electromagnetic contactor S3 is controlled by the controller 82. The electromagnetic contactor S3 turns on when a corresponding power module P is set in operation, and turns off when the corresponding power module P is stopped.

The controller 82 controls the entirety of a corresponding power module P, based on the AC input voltage Vi, the DC voltage VD, the voltage VB across the battery 32, the AC output current Io, and the AC output voltage Vo, etc. In other words, the controller 82 detects whether a power outage has occurred, based on the detection value of the AC input voltage Vi, and controls the converter 4 and the inverter 8 in synch with the phase of the AC input voltage Vi.

The controller 82, in normal operation, also controls the converter 4 so that the DC voltage VD is a desired target voltage VDT. In the event of failure of the commercial AC power supply 30, the controller 82 stops the operation of the converter 4.

The controller 82, in normal operation, further controls the bi-directional chopper 7 so that the voltage VB across the battery 32 is a desired target battery voltage VBT. In the event of failure of the commercial AC power supply 30, the controller 82 controls the bi-directional chopper 7 so that the DC voltage VD is the desired target voltage VDT.

The controller 82 is also connected to the main controller 80 and the controllers 82 of the other power modules P via the communications line 15, and transmits/receives information to/from the main controller 80 and the other controllers 82 via the communications line 15. A serial communications scheme is applied as the communication scheme between the main controller 80 and a respective controller 82. The controllers 82 control the converters 4 and the inverters 8 so that the power modules P can share the same current.

The main controller 80 controls the entirety of the uninterruptible power supply 110, based on, for example, signals from the power modules P. Each controller 82 controls a corresponding power module P, in accordance with a control command provided from the main controller 80.

Specifically, based on the output signals Iof of the current detectors 13, the main controller 80 determines the sum of the output currents Io of the power modules P, that is, a load current IL and determines an appropriate number of power modules P that are required to operate to supply the load current IL. The main controller 80 further compares the determined appropriate number of operating power modules with the current number of operating power modules to determine whether a respective power module P is to be set into operation or stopped. The main controller 80 transmits a signal indicating a result of the determination to a respective controller 82 via the communications line 15.

To stop a corresponding power module P, the controller 82 turns corresponding electromagnetic contactors S1 and S3 off and stops the operations of corresponding converter 4, bi-directional chopper 7, and inverter 8. To set a corresponding power module P into operation, the controller 82 keeps the corresponding electromagnetic contactors S1 and S3 turned on and causes the corresponding converter 4, bi-directional chopper 7, and inverter 8 to continue the operation.

FIG. 7 is a block diagram showing a configuration of the main controller 80 and the controllers 82. Referring to FIG. 7, the main controller 80 and the controller 82 are connected to each other by the communications line 15 so that they can bidirectionally communicate with each other. The communications line 15 is configured to bidirectionally transfer data through serial communications. In the example of FIG. 7, the main controller 80 and the controllers 82 are daisy-chained. Note that the mode of connection between the main controller 80 and the controllers 82 is not limited to daisy chain.

The main controller 80 has the same basic configuration as the main controller 22 of FIG. 2. In other words, the main controller 80 includes a programmable device 40 and a communications I/F 46.

The controllers 82 each have the same basic configuration as the gate driver 66 of FIG. 2. In other words, the controller 82 includes a programmable device 50 and a communications I/F 56.

The main controller 80 and each controller 82 execute a program pre-stored in a memory (an executable program) to cooperate with each other and control a corresponding power module P.

The main controller 80 transmits a transmission signal T1 to a respective controller 82 via the communications line 15. The respective controller 82 transmits a transmission signal T2 to the main controller 80 via the communications line 15. While the uninterruptible power supply 110 is in operation, this communication path can be used to exchange the execution data between the programmable device 40 and the programmable device 50 to control a respective power module P. Similarly, the main controller 80 and the programmable device 50 exchange update data, which is data for updating the programmable device 50, via the communications line 15. For example, the update data is transmitted to the power module P1 to update the programmable device 50 of the power module P1, and the update data is transmitted to the power module P2 to update the programmable device 50 of the power module P2.

As described with reference to FIGS. 2 and 3, the memory 502 stores the executable program in an executable-program storage area 522, and the update program in an update-program storage area 521. If the processor 500 receives the execution data via the communications line 15, the processor 500 causes the executable program to progress, based on the execution data. If the processor 500 receives the update data via the communications line 15, the processor 500 writes the update data into the memory 502 and causes updating of the update program to progress. If the update of the update program is completed (the instruction information is stored) and the programmable device 50 is thereafter reset, processor 500 switches the executable program with the update program and launches the update program.

As such, in the modular uninterruptible power supply 110 according to Embodiment 2, the uninterruptible power supply 110 includes multiple modules (the power modules P), the main controller 80, multiple controllers 82, and the communications line 15. The modules include multiple power converter modules (the power modules P) that are connected in parallel to the load 31. The main controller 80 and the controllers 82 form a daisy chain by the communications line 15.

In the above configuration, the main controller 80 controls the power modules P. The controllers 82 each include the programmable device 50, and they drive the respective power modules P through communications with the main controller 80. The communications line 15 communicatively connect the main controller 80 and the controllers 82. The programmable device 50 includes the memory 502 and the processor 500. The memory 502 stores the executable program and the update program. The processor 500 executes the executable program to drive a corresponding power module P. The main controller 80 can transmit one of the execution data and the update data to the programmable device 50 via the communications line 15 during the execution of the executable program. The execution data is data that is used to execute the executable program. The update data is data that is used to update the update program. If the processor 500 receives the execution data, the processor 500 causes the executable program to progress, based on the execution data. If the processor 500 receives the update data, the processor 500 writes the update data into the memory 502 and causes updating of the update program to progress. If the update of the update program is completed and the programmable device 50 is thereafter reset, the processor 500 ends the executable program and launches the update program as an executable program.

The modular uninterruptible power supply 110 according to Embodiment 2 achieves the same advantages effects as the uninterruptible power supply 100 according to Embodiment 1 described above. In other words, using the shared communications line 15, the update program can be updated by the update program in parallel with the control of the power module P (the execution of the executable program) being continued by the execution data. These programs are switched and launched after the completion of the update, the executable program is switched to the update program and the update program is launched. This can reduce the time period for stopping the operation of the uninterruptible power supply 110. In particular, if the programs in all the programmable devices 50 are rewritten, and all the programmable devices 50 are thereafter reset simultaneously by user operation via the communications line 15, the time period for stopping the operation of the uninterruptible power supply 110 can further be reduced. This enables all the controllers to be efficiently updated in a simplified configuration.

In addition, if the supply of power by the modular uninterruptible power supply 110 requires (n−1) power modules and n power modules (the power modules P1 through Pn) are implemented to ensure redundancy, all the update and resetting can be completed, without having to stop the operation of the uninterruptible power supply 110. For example, after all the programmable devices 50 are rewritten via the communications line 15, initially, the programmable device 50 of the power module P1 is reset, while power is being supplied by the power modules P2 through Pn, except for the power module P1. Next, the supply of power is switched to supply of power by the power modules P1 and P3 through Pn, except for the power module P2, and the programmable device 50 of the power module P2 is reset. Likewise, the programmable devices 50 of the power modules P3 through Pn are thereafter reset sequentially. Doing this obviates the need to stop the operation of the uninterruptible power supply 110.

Even if the reset of the programmable device 50 is required to update the programmable device 50, the transmission of the reset command data via the communications line 15 enables the reset of the programmable device 50, thereby obviating the need for a manual reset operation or the need to separately provide a transmission line for transmitting a reset signal. This enables all the controllers to be efficiently updated in a simplified configuration.

The presently disclosed embodiments should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST

1, 5, 10 capacitor; 2, 9 reactor; 3, 11 AC filter; 4 converter; 6 DC line; 7 bi-directional chopper; 8 inverter; 12, 13 current detector; 82 controller; 22, 80 main controller; 15 communications line; 20 semiconductor switch; 24 operating unit; 30 commercial AC power supply; 31 load; 32 battery; 33 bypass AC power supply; 35 external device; 40, 50 programmable device; 46, 56 serial communications I/F; 60, 62, 64 detector; 66, 68, 70 gate driver; 72 switch I/F; 100, 110 uninterruptible power supply; 400, 500 processor; 402 memory; 460, 562 driver; 406 communications I/F; 404 I/O circuit; 462, 560 receiver; 502 memory; 520 program storage area; 521 update-program storage area; 522 executable-program storage area; 524 instruction-information storage area; B0 bypass module; P1 through Pn power module; S1 through S4 electromagnetic contactor; Fu update mode transition flag; T11, T21 AC input terminal; T12 battery terminal; T13, T22 AC output terminal; and NW communication network.

The invention claimed is:

1. An uninterruptible power supply, comprising:
a plurality of modules;
a main controller that controls the plurality of modules;
a plurality of controllers that drive the plurality of modules, respectively, through communications with the main controller, the plurality of controllers each including a programmable device; and
a serial communications line that communicatively connects the main controller and the plurality of controllers, wherein
the programmable device includes:
  a memory storing an executable program and an update program; and
  a processor that drives a corresponding module by executing the executable program, wherein
while the executable program is being executed, the main controller is able to transmit, to the programmable device via the serial communications line, one of: execution data that is used for execution of the executable program; and update data that is used for updating the update program,
when the processor receives the execution data, the processor causes the executable program to progress based on the execution data,
when the processor receives the update data, the processor writes the update data into the memory and causes the updating of the update program to progress, and
when the programmable device is reset after the updating of the update program is completed, the processor ends the executable program and launches the update program as the executable program.

2. The uninterruptible power supply according to claim 1, wherein
the main controller is able to transmit, to the programmable device via the serial communications line, a reset command data for resetting the programmable device, and
when the programmable device receives the reset command data, the programmable device is reset.

3. The uninterruptible power supply according to claim 1, wherein
when the updating of the update program is completed, the processor stores, into the memory, instruction information instructing switching between programs, and
when the programmable device is reset and the instruction information is stored in the memory, the processor ends the executable program and launches the update program as the executable program.

4. The uninterruptible power supply according to claim 1, wherein
the memory includes a first storage area storing the executable program and a second storage area storing the update program, and
when the programmable device is reset, the processor stores the executable program, stored in the first storage area, into the second storage area as the update program, and stores the update program, stored in the second storage area, into the first storage area as the executable program.

5. The uninterruptible power supply according to claim 1, wherein
the plurality of modules include a plurality of power converter modules connected in parallel to a load.

6. The uninterruptible power supply according to claim 5, wherein
the main controller and the plurality of controllers form a daisy-chained connection by the serial communications line.

7. The uninterruptible power supply according to claim 1, wherein
the plurality of modules include:
  a converter that converts an alternating-current power supplied from an alternating-current into a direct-current power;
  an inverter that converts a direct-current power supplied from the converter or a power storage device into an alternating-current power and supplies the alternating-current power to a load; and
  a bi-directional chopper that selectively performs a charging operation in which some of the direct-current power generated by the converter is stored into the power storage device and a discharging operation in which the direct-current power stored in the power storage device is supplied to the inverter, wherein the plurality of controllers include a plurality of gate drivers that respectively drive the converter, the inverter, and the bi-directional chopper.

8. The uninterruptible power supply according to claim 2, wherein
the plurality of modules include a plurality of power converter modules connected in parallel to a load.

9. The uninterruptible power supply according to claim 3, wherein
the plurality of modules include a plurality of power converter modules connected in parallel to a load.

10. The uninterruptible power supply according to claim 4, wherein
the plurality of modules include a plurality of power converter modules connected in parallel to a load.

11. The uninterruptible power supply according to claim 2, wherein
the plurality of modules include:
  a converter that converts an alternating-current power supplied from an alternating-current into a direct-current power;
  an inverter that converts a direct-current power supplied from the converter or a power storage device into an alternating-current power and supplies the alternating-current power to a load; and
  a bi-directional chopper that selectively performs a charging operation in which some of the direct-current power generated by the converter is stored into the power storage device and a discharging operation in which the direct-current power stored in the power storage device is supplied to the inverter, wherein the plurality of controllers include a plurality of gate drivers that respectively drive the converter, the inverter, and the bi-directional chopper.

12. The uninterruptible power supply according to claim 3, wherein the plurality of modules include:
- a converter that converts an alternating-current power supplied from an alternating-current into a direct-current power;
- an inverter that converts a direct-current power supplied from the converter or a power storage device into an alternating-current power and supplies the alternating-current power to a load; and
- a bi-directional chopper that selectively performs a charging operation in which some of the direct-current power generated by the converter is stored into the power storage device and a discharging operation in which the direct-current power stored in the power storage device is supplied to the inverter, wherein the plurality of controllers include a plurality of gate drivers that respectively drive the converter, the inverter, and the bi-directional chopper.

13. The uninterruptible power supply according to claim 4, wherein the plurality of modules include:
- a converter that converts an alternating-current power supplied from an alternating-current into a direct-current power;
- an inverter that converts a direct-current power supplied from the converter or a power storage device into an alternating-current power and supplies the alternating-current power to a load; and
- a bi-directional chopper that selectively performs a charging operation in which some of the direct-current power generated by the converter is stored into the power storage device and a discharging operation in which the direct-current power stored in the power storage device is supplied to the inverter, wherein the plurality of controllers include a plurality of gate drivers that respectively drive the converter, the inverter, and the bi-directional chopper.

* * * * *